United States Patent [19]

Honda et al.

[11] Patent Number: 5,321,059

[45] Date of Patent: Jun. 14, 1994

[54] PROCESS FOR PREPARING POLYTETRAFLUOROETHYLENE GRANULAR POWDER CONTAINING FILLER AND POLYTETRAFLUOROETHYLENE GRANULAR PREPARED BY THE SAME

[75] Inventors: Norimasa Honda; Kazuhide Sawada; Kenjiro Idemori; Hirokazu Yukawa, all of Settsu, Japan

[73] Assignee: Daikin Industries, Ltd., Osaka, Japan

[21] Appl. No.: 973,522

[22] Filed: Nov. 9, 1992

Related U.S. Application Data

[63] Continuation of Ser. No. 689,576, Apr. 23, 1991, abandoned.

[30] Foreign Application Priority Data

Apr. 24, 1990 [JP] Japan .................. 2-109366

[51] Int. Cl.$^5$ .......................... C08K 9/06; C08K 3/20; C08J 3/00; C08L 27/12
[52] U.S. Cl. .................................. 523/212; 523/213; 523/214; 524/546
[58] Field of Search .................. 523/212, 213, 214; 524/546

[56] References Cited

U.S. PATENT DOCUMENTS

| | | | |
|---|---|---|---|
| 3,929,721 | 12/1975 | Leverett .......................... | 524/546 |
| 3,998,770 | 12/1976 | Malhotra . | |
| 4,370,436 | 1/1983 | Nakamura et al. ................. | 524/546 |
| 4,454,288 | 6/1984 | Lee et al. ........................... | 524/493 |

Primary Examiner—Paul R. Michl
Assistant Examiner—P. Niland
Attorney, Agent, or Firm—Armstrong, Westerman, Hattori, McLeland & Naughton

[57] ABSTRACT

A process for preparing a filler-containing PTFE granular powder, which comprises mixing uniformly a PTFE powder having an average particle size of not more than 100 μm and a (semi-)hydrophilic filler which is surface-treated with an organosilane of the formula:

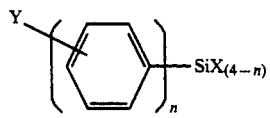

in a two-phase liquid medium comprising water and a water-insoluble organic liquid having a surface tension of not more than 35 dynes/cm at 25° C. Accordingly to the process, the separation of filler can be avoided, and a colorless molded article can be provided.

6 Claims, 1 Drawing Sheet

PROCESS FOR PREPARING POLYTETRAFLUOROETHYLENE GRANULAR POWDER CONTAINING FILLER AND POLYTETRAFLUOROETHYLENE GRANULAR PREPARED BY THE SAME

This application is a continuation of application Ser. No. 07/689,576 filed Apr. 23, 1991 now abandoned.

BACKGROUND OF THE INVENTION

The present invention relates to a process for preparing polytetrafluoroethylene (hereinafter referred to as "PTFE") granular powder containing a filler and PTFE granular powder prepared by the process.

The molding powder of PTFE is a PTFE powder prepared by finely dividing coarse particles obtained by suspension polymerization, and it has been used for molding by means of compression molding or ram extrusion molding. The particle size of the finely divided PTFE particles (primary particle size) is 5 μm at the smallest and up to about 1,000 μm, usually has an average particle size of not more than 100 μm. The PTFE molding powder into which a hydrophilic or semi-hydrophilic filler is uniformly incorporated also has been used as a filler-containing PTFE molding powder having an improved properties such as abrasion resistance and hardness in comparison with those of the PTFE powder.

It is possible to uniformly incorporate the filler to the PTFE molding powder by means of a special mixing machine. Recently in advance with molding automation, an agglomerated granular powder tends to be used as a filler-containing molding powder having an improved handling property, especially powder flowability, and a high bulk density.

The method for agglomerating and granulating is roughly classified into a dry mixing method or a wet mixing method. The former is a method using no water, and the latter is a method using water. As the typical example of the latter there is known a method in which a mixture of the PTFE powder, a filler and a water-insoluble organic liquid is agitated in water.

The wet mixing method is superior to the dry mixing method because an automation of granulation process can be relatively easy, though a separation step and a drying step after the aqueous treatment are required.

A difficulty has been encountered in the uniform mixing of the PTFE powder with a hydrophilic or semi-hydrophilic filler like a glass powder, because the hydrophilic or semi-hydrophilic filler tends to transfer easily into an aqueous phase. As a result, an agglomerated PTFE granular powder containing all of the hydrophilic or semi-hydrophilic filler used cannot be obtained, and a portion of the filler remains in the treating water. The phenomenon is called as "separation of filler". Also the filler in the granular powder is apt to come off from the obtained granular powder during handling.

In order to solve these problems, there is employed a process in which, prior to the mixing in water, the hydrophilic or semi-hydrophilic filler is previously subjected to hydrophobic surface treatment, whereby lowering the surface activity near the surface activity of the PTFE powder, or a process in which the mixing is carried out in the water-organic liquid medium to which a certain compound having the above activity-lowering effect is added at the mixing.

Among the processes, as processes in which a silicon-containing compound is used, there have hitherto been known processes as mentioned below.

(a) A process in which an amino functional organosilane and/or a water-soluble silicone resin is added into a water-organic liquid medium (Japanese Examined Patent Publication No. 47269/1978, No. 40099/1979).

(b) A process in which a silicone resin and melt processible TFE copolymer particles are present in the system (Japanese Examined Patent Publication No. 7164/1982).

(c) A process in which a filler surface-treated with an aminosilane compound is mixed in the presence of a nonionic surface active agent (Japanese Examined Patent Publication No. 21694/1985).

(d) A process in which a filler surface treated with a perfluoroalkylsilane is used (Japanese Unexamined Patent Publication No. 139628/1989).

It is extremely insufficient to prevent the separation of filler according to the method (a). In the method (b), there is a disadvantage that a heat resistance of a PTFE powder is lowered. The methods of (c) and (d) in which a filler is previously surface-treated do not have the above-mentioned disadvantages of (a) or (b). In the method (c) using an aminosilane, however, the obtained molded article is colored in a central part after sintering. Also in the method (d), though the obtained molded article is endowed with excellent electric characteristics, there is a disadvantage of coloration similarly to the method (c).

According to the present invention, there can be provided a process for decreasing the separation of filler and preparing a PTFE granular powder in which a filler is uniformly dispersed. The obtained granular powder can give a colorless molded article.

SUMMARY OF THE INVENTION

The present invention relates to a process for preparing PTFE granular powders containing fillers, which comprises admixing a PTFE powder having an average particle size of not more than 100 μm and a hydrophilic or semi-hydrophilic filler (hereinafter referred to as "(semi-)hydrophilic filler") which is surface-treated with an organosilane of the formula (I):

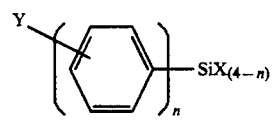

wherein X is a hydrolyzable residue having no amino group, Y is hydrogen atom, an alkyl group of 1 to 4 carbon atoms or a halogen atom, n is 1 or 2, in a two-phase liquid medium comprising water and a water-insoluble organic liquid having a surface tension of not more than 35 dynes/cm at 25° C.

The present invention also relates to a PTFE granular powder prepared by the process of the present invention, the obtained granular powder being containing the filler which is surface-treated with the above-mentioned specific organosilane and is dispersed uniformly.

DETAILED DESCRIPTION

Figure 1:
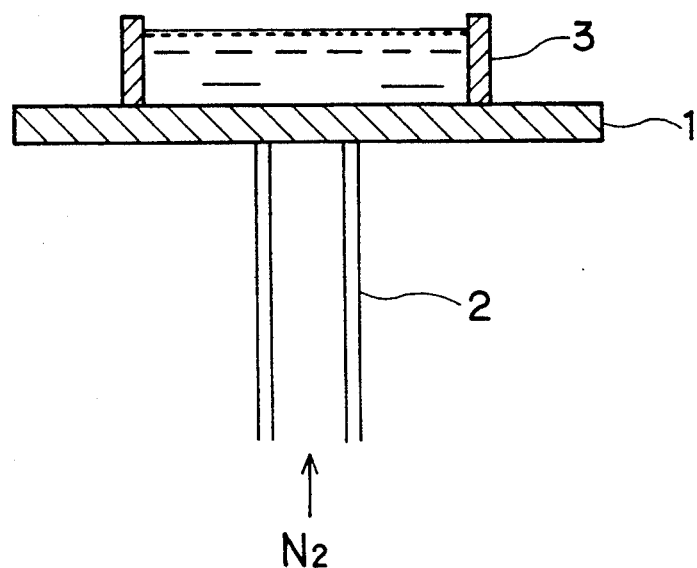
FIG. 1 is a schematic sectional view of the testing equipment for measuring gas permeability.

In the process of the present invention are used the PTFE powder, the (semi-)hydrophilic filler, the organosilane, the water-insoluble organic liquid, water and, if necessary, the other additives such as a silicone resin and a PTFE dispersion.

The PTFE powder used in the present invention is, for instance, a homopolymer of tetrafluoroethylene (hereinafter referred to as "TFE") and a copolymer of TFE modified with a copolymerizable monomer of not more than 2% by weight. Examples of the modifiers are, for instance, a perfluoroalkene having 3 to 6 carbon atoms (e.g. hexafluoropropylene), perfluoro(alkylvinylether) having 3 to 6 carbon atoms (e.g. perfluoro(propylvinylether)) or chlorotrifluoroethylene and the like. These copolymers are not melt-processable as of the PTFE homopolymer. These polymers are used as a powder pulverized to an average particle size of not more than 100 $\mu$m. In the present invention may be used a small amount of PTFE dispersion having an average particle size of 0.05 to 0.5 $\mu$m in addition to the above-mentioned PTFE powder. The PTFE dispersion can act to prevent the separation of filler, and is particularly useful when a mixing amount of filler is large. Further addition of the PTFE dispersion can prevent generation of fine powder in the granulation step. Though prevention of producing the fine powder can also be accomplished by pressing a granular powder tightly, the physical properties decrease in this case. When using the PTFE dispersion, since PTFE in the dispersion covers the finely divided particles causing disappearance of such fine particles, the above-mentioned properties are not lowered and thus the handlability can be improved. It is preferable that an amount of the PTFE dispersion is 0.1 to 2.5% by weight, preferably 0.2 to 2.5% by weight based on the mixed powder of the PTFE powder and the filler. It is preferred to add the dispersion to water before the water-insoluble organic liquid is added.

Examples of the PTFE dispersion used in the present invention are, for instance, a TFE homopolymer or a copolymer of TFE modified with a copolymerizable monomer. Examples of the modifiers are the same as the modifiers of the above-mentioned PTFE powder.

As the (semi-)hydrophilic fillers used in the present invention there can be employed, for instance, hydrophilic fillers such as powdered glass fibers, glass beads, molten silica powders, crystalline silica powders, white carbon powders, alumina powders and bronze powders, and semi-hydrophilic fillers such as potassium titanate fiber powders, talk powders, calcium carbonate powders, zinc oxide powders, tin oxide powders, boron trinitrade powders, carbon fiber powders, molybdenum bisulfite powders and graphite powders. The above-mentioned powdered fillers are fillers generally used for the PTFE powder and having a particle size of not more than 200 mesh. The amount of the (semi-)hydrophilic filler is 5 to 40% by weight, preferably 15 to 25% by weight based on the PTFE powder. When the filler is less than 5% by weight, the improved effects of the molded article such as abrasion resistance and creep resistance cannot be obtained. When using more than 40% by weight, the molded article tends to become low in physical properties such as expansion force or elongation. The glass used in the invention is E glass (non-alkali glass for electrical use), S glass (high tempered glass), D glass (low dielectric glass), quartz glass, A glass (acid-resistant glass), C glass (alkali-containing glass for chemical use) and the like.

As described above, as an agent for treating the (semi-)hydrophilic filler for the PTFE powder, there has hitherto been used a silane compound containing amino group, a silicone resin or a perfluoroalkylsilane. In the present invention are used an organosilane containing no amino group as represented by the above-mentioned formula (I). By the surface-treatment with the specific organosilane, the separation of filler in the wet mixing method can be improved, and further it is possible to prevent the obtained molded article from coloration. The reason is not yet clear, but is presumably that the organosilane is stable chemically and thermally because it contains an aromatic ring bonded directly to a silicon atom. Therefore, the organosilane is less decomposed at sintering, and thus it is able to prevent the molded article from coloration. This is especially effective in view of coloration when using a white filler. Also, it is assumed that the specific organosilane has a water repellency due to the aromatic ring and has a large adhesiveness to the PTFE powder due to its high compatibility with a fluorine-containing resin.

Examples of the organosilane of the formula (I) are, for instance, phenyltrimethoxysilane, phenyltriethoxysilane, p-chlorophenyltrimethoxysilane, p-bromomethylphenyltrimethoxysilane, diphenyldimethoxysilane, diphenyldiethoxysilane, diphenylsilane diol and the like. Among them, the organosilane of the formula (II):

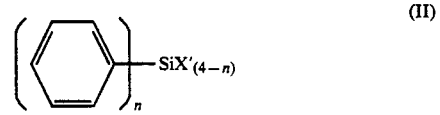

(wherein X' is an alkoxy group having 1 to 4 carbon atoms, n is as defined above) is preferred. These phenyltrialkoxysilane and diphenyldialkoxysilane in which a phenyl group binds directly to a silicon atom are preferable, because the phenyl group is especially heat-stable and water-repellent. Particularly preferable is phenyltrimethoxysilane or phenyltriethoxysilane. An amount of the organosilane is not limited, and is usually 0.001 to 10% by weight, preferably 0.1 to 1.0% by weight based on the (semi-)hydrophilic filler.

The water-insoluble organic liquid which constitutes the two-phase liquid medium together with water has a surface tension of not more than 35 dynes/cm at 25° C. Examples of the organic liquid are, for instance, an alicyclic hydrocarbon such as cyclopentane or cyclododecane, an aromatic hydrocarbon such as benzene, toluene or xylene, a halogenated hydrocarbon such as tetrachloroethylene, trichloroethylene, chloroform, chlorobenzene, 1,1,1-trichloroethane, tetrachlorodifluoroethane, trichlorotrifluoroethane, trichlorofluoromethane and the like. In addition, a halogenated hydrocarbon having 2 to 3 carbon atoms, at least one fluorine atom and at least one hydrogen atom which has not been used as a medium for granulation operation of the PTFE powder, is preferably used, because the halogenated hydrocarbon uninflammable and can satisfy the requirement from so-called degration of CFC. Examples of the halogenated hydrocarbon are, for instance, 1,1-dichloro-2,2,2-trifluoroethane (surface tension: 17 dynes/cm, bp: 27° C.), 1,1-dichloro-1-fluoroethane (20 dynes/cm, 32° C.), 1,1-dichloro-2,2,3,3,3-pentafluoropropane (16 dynes/cm, 51° C.), 1,3-dichloro-1,1,2,2,3-pentafluoropropane (18 dynes/cm, 56° C.), and the like. Particularly, it is preferable that 1,1-dichloro-2,2,3,3,3-pentafluoropropane or 1,3-dichloro-1,1,2,2,3-pentafluoropropane is employed because of recovery of the medium. 1,1,1-Trichloroethane is also preferable.

The organic liquid is used alone or in a mixture of two or more kinds to form the two-phase liquid medium with water. The mixing ratio is different depending on kinds of the organic liquid, the filler and the desired average particle size. The ratio of water/organic liquid is usually 20/1 to 3/1, preferably 10/1 to 5/1 (weight ratio). Water and the organic liquid are generally used in an amount of about 2 to 10 l and about 0.2 to 2.0 l, respectively, based on 1 kg of the mixture of the PTFE powder and the (semi-)hydrophilic filler.

In the process of the present invention, hydrophobic fillers such as carbon black other than the above-mentioned fillers may be optionally added. The objects of the invention are not inhibited by the use of these fillers.

As a solvent for the surface-treating agent used in the treatment of the (semi-)hydrophilic filler with the organosilane, polar solvents such as ketones, alcohols and water are preferable. Various methods can be employed for the surface-treatment. For example, there may be preferably employed a method in which the (semi-)hydrophilic filler is soaked in an aqueous solution of the organosilane and pulled up, and desirably dehydrated with a centrifugal machine, then dried and heated at a temperature of not less than 100° C., preferably about 110° to 180° C. A concentration of the aqueous solution of organosilane is about 0.001 to 10% by weight, preferably approximately 0.1 to 1.0% by weight.

In a preferred embodiment of the present invention, the thus prepared starting materials are mixed in the following procedures to produce a granular powder.

As the fundamental procedures of the wet-mixing granulation method, are employed the procedures described in, for example, Japanese Examined Patent Publication No. 22619/1969, No. 1549/1972, No. 17855/1974, and Japanese Unexamined Patent Publication No. 34936/1972, and the like. For instance, the PTFE powder is homogeneously mixed with the (semi-)hydrophilic filler which is surface-treated with the organosilane. At that time, a silicone resin described hereinafter may be added. The obtained filler-containing PTFE mixed powder is agitated in the two-phase liquid medium to prepare a slurry, then agglomerated and granulated. Before slurrying, the mixed powder may be pre-mixed in water. In such a case, the water-insoluble organic liquid is added after the pre-mixing to prepare the two-phase liquid medium, and then the granulation step is carried out.

When adding the PTFE dispersion, it is preferable to previously add it to water for the pre-mixing. Anyhow, the PTFE dispersion may be present during the granulation step. The addition of the PTFE dispersion is effective for avoiding the separation of filler and for avoiding the generation of fine powder at the granulation step.

A molded article prepared by using the granular powder of the present invention is colorless in comparison with conventional molded articles. However, when a diameter or thickness of desired molded article becomes larger, the large scaled article sometimes becomes tint. This is caused by carbons which are yielded by carbonizing a stain on the filler or unstable terminal groups of PTFE at the sintering, and remain in the molded article. In order to avoid such undesirable coloration, Japanese Examined Patent Publication No. 21178/1985 discloses a method in which a silicone resin is admixed with a PTFE granular powder. The effect is apparently that the admixed silicone resin is volatilized at the sintering to produce narrow pores through the molded article, whereby the impure gaseous carbon escapes to outside. Accordingly, when using a large amount of silicone resin, the produced molded article becomes porous, and mechanical strengths of the porous article are lowered.

Since the process described in the Japanese Examined Patent Publication No. 21178/1985 relates to the dry mixing method, the separation of filler is not necessary to take account. In the wet mixing method, the separation of filler cannot be avoided when the silicone resin has been used alone in a small amount. Therefore, the silicone resin is used in a large amount of 0.5 to 30 parts by weight with respect to 1,000 parts by weight of the PTFE powder in the Japanese Examined Patent Publication No. 40099/1979. As a result, the sintered molded article becomes porous and also the granulation tank is stained with the silicone resin.

According to the present invention, when producing a molded article having a large diameter or thickness, the PTFE granular powder preferably contains the silicone resin in an amount of 0.00005 to 0.05% by weight, preferably 0.0005 to 0.005% by weight based on the mixed powder of the PTFE powder and the filler. Such a small amount of the silicone resin will not make the sintered article porous, and the separation of filler can be avoided by the surface-treatment of filler with the organosilane.

As the silicone resin used in the present invention, known compounds are employed. For instance, a liquid polymer having the linear construction:

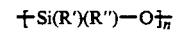

wherein R' and R" are an alkyl, aryl, alkylaryl or aralkyl group or hydrogen, n is about 100 to 2000, described in Japanese Examined Patent Publication No. 40099/1979. Examples of the silicon resin are, for instance, phenylmethylsiloxane, dimethylsiloxane, monophenylsiloxane, methylhydrogensiloxane, and the like.

Since the desired effects can be obtained when the silicone resin is present in the PTFE granular powder, the time when the silicone resin is added is not important. Preferably, in the granulation step, the silicone resin may be added, for instance, to water and then pre-mixed prior to the addition of the water-insoluble organic liquid, or may be added to the water-insoluble organic liquid and dissolved therein. Alternatively, the silicone resin can be incorporated by adding the silicone resin and tetrachloroethylene to the surface-treated (semi-)hydrophilic filler and the PTFE powder, mixing them, and heating the obtained filler-containing PTFE powder to volatilize tetrachloroethylene, and then granulating.

Thus obtained PTFE granular powder uniformly containing the filler by the process of the present invention has an average particle size of about 200 to 800 μm, a bulk density of about 0.50 to 1.00 g/cc, and a good powder flowability. The molded article obtained from the above-mentioned granular powder is colorless and is excellent in mechanical properties such as tensile strength and elongation.

The present invention is more specifically described and explained by means of the following Examples and Comparative Examples. It is to be understood that the present invention is not limited to the Examples, and various changes and modifications may be made in the invention without departing from the spirit and scope thereof.

EXAMPLES 1 to 3

Surface treatment of filler

In a 1.0% by weight aqueous solution of the organosilane shown in Table 1 was soaked the (semi-)hydrophilic filler shown in the same Table, agitated sufficiently, and then allowed to stand. The precipitated filler was filtered, dried at 120° C. for 12 hours in an oven to give a (semi-)hydrophilic filler surface-treated with the organosilane.

Production of filler-containing PTFE granular powder

A 3 l stainless steel cyclindrical granulation tank equipped with two baffles and having a stirring machine with two wings of flat blade, was charged with a liquid mixture of water and the organic liquid shown in Table 1 in the amounts shown in the same Table. To the granulation tank was added 600 g of a mixed powder of a PTFE powder having an average particle size of 35 μm (powder flowability: 1) and the surface-treated (semi-)hydrophilic filler (80 : 20 by weight). The mixture was agitated for five minutes at 1200 rpm, and then continued the agitation at 600 rpm for 30 minutes to granulate the PTFE powder and the filler by coagulation.

After agitation, the obtained granular powder was filtered with a sieve of 60 mesh. The remaining solid on the sieve was dried at 150° C. for 16 hours in a dry oven to give a granular powder.

The obtained granular powder was determined in average particle size, bulk density, powder flowability and generation of fine powder. The molded article prepared by using the granular powder was determined in coloration and color change, gas permeability, tensile strength and elongation. For measuring the degree of filler separation during granulation step, the granulated particles were filtered with a 60 mesh sieve, and the filtrate was filtered again with a filter paper, followed by drying the filter paper to determine a weight of the filler present in the filtrate. Divided the of separated filler weight in filtrate by the weight of filler used, a degree of filler separation (%) is given.

The results are shown in Table 1. The above-mentioned measurements were carried out according to the following methods.

Average particle size

Standard sieves of 10, 20, 32, 48, 60 and 80 mesh ("mesh" in the specification means "inch mesh") are superposed in order from the top, and the powder is placed on the 10 mesh sieve, and screened.

The ratios of the powder remained on each sieve are calculated by percentage by weight. An average particle size (μm) is the value corresponding to cumulative percentages of 50% on a log probability paper.

Bulk density

A bulk density of the PTFE granular powder is determined according to Japanese Industrial Standard (JIS)K 6891 (A sample is dropped into a 100 cc stainless steel cylindrical container from a damper, and then an exess amount of the sample is cut by sliding a plate. The weight (g) of the sample in the container divided by the volume (cc) is defined as the bulk density (g/cc)).

Powder flowability

A powder flowability of the PTFE granular powder is determined according to the method described in detail in Japanese Examined Patent Publication No. 21694/1985. This method is as follows: A measuring apparatus having an upper hopper and an under hopper are employed. The powder flowability is examined by dropping the powder from the upper hopper into the under hopper, then dropping the powder from the under hopper. When the amount of the powder becomes larger, a flowability of PTFE becomes lower. In view of this point, the powder fallings down from the under hopper in a large amount, has a good flowability. In the above measurement the flowability is evaluated by the number of times, i.e. 0 to 7 (more than 7 is represented by 8<). The bigger the number, the better a flowability becomes.

Generation of fine powder 100 g of a sample powder is screened with a 80 mesh standard sieve. Generation rate (%) of fine powder is calculated according to the following equation.

$$\text{Generation rate of fine powder (\%)} = \frac{\text{Weight (g) of 80 mesh pass powder}}{\text{Weight (g) of sample}} \times 100$$

Coloration of molded article

The PTFE granular powder is pre-formed under a pressure of 500 kg/cm$^2$, sintered at a temperature of 380° C. for 24 hours, and then cooled down outside the furnace to obtain a cylindrical molded article with a diameter of 256 mm and a height of 250 mm. The coloration of the article is determined by a Z value measured with a color and color difference meter ND-100 IDP (available from Nippon Denshoku Kogyo Kabushiki Kaisha). The Z value means that colorless is 100 and a degree of coloration is divided by 100 grades. A value of not less than 90 is represented by A, a value of 90−80 represented by B, 80−60 represented by C, and not more than 60 represented by D. Change of color of a molded article is observed with naked eyes.

Tensile strength and elongation

The PTFE granular powder is pre-formed under a pressure of 500 kg/cm$^2$, sintered at a temperature of 380° C. for 3 hours, and then cooled down to room temperature outside a furnace to give a sheet of 1.5 mm in thickness. A strength and an enlongation at break of a test piece prepared by stamping the sheet with a dumbbell Type 3 die defined in JIS K 6031 are regarded as a tensile strength (kg/cm$^2$) and an elongation (%), respectively.

Gas permeability

A cylindrical molded article (diameter 50 mm, height 50 mm) is prepared by pre-forming the filler-containing PTFE granular powder under a pressure of 500 kg/cm$^2$, sintering the pre-formed article at 370° C. for 6 hours, and then cooling it outside the furnace. By cutting the center portion of the molded article, a disc type test piece (diameter 50 mm, thickness 1.5 mm) is prepared. A gas permeability of the test piece is measured according to the testing equipment shown in FIG. 1. The disc 1 to be tested is fixed to an end of a stainless steel pipe 2 (8 mm φ), and N₂ gas is introduce into the pipe 2 under 20 kg/cm² for 2 hours, and then a stainless steel ring 3 provided on the disc 1 is filled with water. The gas permeability is determined with naked eyes in view of generation of bubbles.

○: No bubble
Δ: Small bubbles on the disc
X: Many bubbles continuously generated from the disc

TABLE 1

|  | Example 1 | Example 2 | Example 3 |
|---|---|---|---|
| Mixed powder of PTFE and glass powder (g) | 600 | 600 | 600 |
| (Semi-)hydrophilic filler |  |  |  |
| Kind | glass fiber powder | glass fiber powder | molten silica |
| Average particle size or average fiber length (μm) | 40 | 40 | 50 |
| Organosilane for surface-treatment |  |  |  |
| Kind | phenyltrimethoxysilane | phenyltrimethoxysilane | phenyltrimethoxysilane |
| Volume of water (ml) | 1500 | 1300 | 1500 |
| Organic liquid |  |  |  |
| Kind | 1,1,1-trichloroethane | 1,3-dichloro-1,1,2,2,3-pentafluoropropane | 1,1-dichloro-2,2,3,3,3-pentafluoropropane |
| (Surface tension: dyne/cm) | (26) | (18) | (16) |
| Volume (ml) | 300 | 300 | 400 |
| Degree of filler separation (%) | 0.5 | 1.0 | 0.8 |
| Properties of granular powder |  |  |  |
| Average particle (μm) | 410 | 427 | 550 |
| Bulk density (g/cc) | 0.75 | 0.72 | 0.78 |
| Powder flowability (times) | more than 7 | 7 | 6 |
| Generation ratio of fine powder (%) | 1.5 | 1.0 | 1.3 |
| Properties of molded article |  |  |  |
| Coloration or color change | B | B | B |
| Gas permeability | ○ | ○ | ○ |
| Tensile strength (kg/cm²) | 193 | 185 | 188 |
| Elongation (%) | 260 | 240 | 224 |

EXAMPLES 4 TO 6

The procedure of Example 1 was repeated in the same manner except that a starting material shown in Table 2 was used.

The properties of the obtained PTFE granular powder and a molded article prepared therefrom were measured in the same manner as in Example 1. The results are shown in Table 2.

TABLE 2

|  | Example 4 | Example 5 | Example 6 |
|---|---|---|---|
| Mixed powder of PTFE and glass powder (g) | 600 | 600 | 600 |
| (Semi-)hydrophilic filler |  |  |  |
| Kind | bronze powder | carbon fiber powder | glass beads |
| Average particle size or average fiber length (μm) | 40 | 70 | 70 |
| Organosilane for surface-treatment |  |  |  |
| Kind | phenyltrimethoxysilane | diphenyldimethoxysilane | phenyltrimethoxysilane |
| Volume of water (ml) | 1500 | 1500 | 1500 |
| Organic liquid |  |  |  |
| Kind | 1,1-dichloro-1-fluoroethane | 1,1-dichloro-2,2,2-trifluoroethane | 1,1,1-trichloroethane |
| (Surface tension: dyne/cm) | (20) | (17) | (26) |
| Volume (ml) | 300 | 300 | 300 |
| Degree of filler separation (%) | 2.0 | 1.8 | 1.5 |
| Properties of granular |  |  |  |

TABLE 2-continued

| | Example | | |
|---|---|---|---|
| | 4 | 5 | 6 |
| powder | | | |
| Average particle (μm) | 470 | 480 | 550 |
| Bulk density (g/cc) | 0.69 | 0.65 | 0.80 |
| Powder flowability (times) | 6 | 6 | 8< |
| Generation ratio of fine powder (%) | 1.8 | 1.7 | 1.5 |
| Properties of molded article | | | |
| Coloration or color change | no change of color | no change of color | B |
| Gas permeability | ○ | ○ | ○ |
| Tensile strength (kg/cm²) | 182 | 190 | 160 |
| Elongation (%) | 270 | 235 | 290 |

EXAMPLE 7

The granulation tank used in Example 1 was charged with 1500 ml of water and a PTFE dispersion (PTFE coloidal dispersion having particles of 0.1 to 0.5 μm average particle size) in the amount shown in Table 3, and then the mixture was agitated. The amount of the PTFE dispersion is represented by % by weight based on the mixture of PTFE powder and filler.

To the granulation tank was added 600 g of a homogenous mixture (PTFE/filler=80/20 by weight) of the PTFE powder (average particle size 35 μm, powder flowability 1) and the glass fiber powder (average fiber length 40 μm) which was surface-treated with phenyltrimethoxysilane in the same manner as in Example 1. The mixture was pre-mixed by agitating at 1200 rpm, and after 5 minutes 300 ml of 1,1,1-trichloroethane was added thereto, and continuously agitating for 30 minutes at 600 rpm to give a filler-containing PTFE granular powder. The properties of the obtained filler-containing PTFE granular powder and a molded article prepared therefrom were measured in the same manner as in Example 1 except that a sample for coloration measurement was 100 mm in diameter and 100 mm in height. The results are shown in Table 3.

TABLE 3

| | Example 7 | | | |
|---|---|---|---|---|
| Amount of PTFE dispersion (wt %) | 0.25 | 0.5 | 1.0 | 2.5 |
| Degree of filler separation (%) | 1.0 | 1.5 | 1.3 | 2.0 |
| Properties of granular powder | | | | |
| Average particle (μm) | 490 | 510 | 480 | 473 |
| Bulk density (g/cc) | 0.75 | 0.74 | 0.73 | 0.71 |
| Powder flowability (times) | 7 | 6 | 6 | 5 |
| Generation ratio of fine powder (%) | 0.5 | 0.3 | 0.2 | 0.1 |
| Properties of moldings | | | | |
| Coloration or color change | B | B | B | B |
| Gas permeability | ○ | ○ | ○ | ○ |
| Tensile strength (kg/cm²) | 200 | 205 | 195 | 210 |
| Elongation (%) | 250 | 255 | 248 | 265 |

EXAMPLE 8

The granulation tank was charged with 1500 ml of water and 600 g of a homogeneous mixture (PTFE/filler=80/20 by weight) of 480 g of the PTFE powder (average particle size 35 μm, powder flowability 1) and 120 g of the glass fiber powder (average fiber length 40 μm) which was surface-treated with phenyltrimethoxysilane in the same manner as in Example 1. The mixture was pre-mixed by agitating at 1200 rpm, and after 5 minutes the amount shown in Table 4 of phenylmethylsiloxane dissolved in 200 ml of 1,1,1-trichloroethane (surface tension 26 dynes/cm) was added thereto, and continuously agitating for 30 minutes at 600 rpm to give a filler-containing PTFE granular powder.

The properties of the obtained PTFE granular powder and a molded article prepared therefrom were measured in the same manner as in Example 7. The result are shown in Table 4. The amount of phenylmethylsiloxane is represented by % by weight based on the mixture of PTFE powder and filler.

TABLE 4

| | Example 8 | | | | |
|---|---|---|---|---|---|
| Amount of phenylmethylsiloxane (wt %) | 0 | 0.00005 | 0.0005 | 0.00375 | 0.005 |
| Degree of filler separation (%) | | 1.5 | | | |
| Properties of granular powder | | | | | |
| Average particle (μm) | 452 | 475 | 448 | 440 | 460 |
| Bulk density (g/cc) | 0.79 | 0.80 | 0.81 | 0.79 | 0.80 |
| Powder flowability (times) | 7 | 7 | 7 | 7 | 7 |
| Generation ratio of fine powder (%) | 2.0 | 1.5 | 1.9 | 1.3 | 1.1 |
| Properties of moldings | | | | | |
| Coloration or color change | B | A | A | A | A |
| Gas permeability | ○ | ○ | ○ | ○ | ○ |
| Tensile strength (kg/cm²) | 230 | 235 | 224 | 224 | 247 |
| Elongation (%) | 280 | 302 | 260 | 288 | 171 |

COMPARATIVE EXAMPLES 1 to 6

The procedure of Example 1, 7 or 8 was repeated similarly except that starting materials and conditions shown in Table 5 were employed. Comparative Example 5 is a comparative experiment of Example 7 in which the PTFE dispersion was added in an amount of 5% by weight. Comparative Example 6 is a comparative experiment of Example 8 in which phenylmethylsiloxane was added an amount of 1% by weight. In the experiment using carbontetrachloride as an organic liquid (Comparative Example 4) the mixed powder could not be agglomerated and any granular powder could not be obtained.

The properties of the granular powder obtained in Comparative Examples 1 to 3 and 5 to 6 and the molded article prepared therefrom were measured in the same manner as in Example 1.

The results are shown in Table 5.

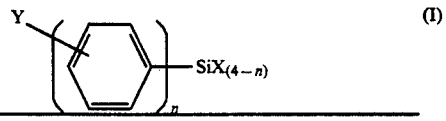

TABLE 5

| | Comparative Example | | | | | |
|---|---|---|---|---|---|---|
| | 1 | 2 | 3 | 4 | 5 | 6 |
| Mixed powder of PTFE and glass powder (g) | 600 | 600 | 600 | 600 | 600 | 600 |
| (Semi-)hydrophilic filler | | | | | | |
| Kind | glass fiber powder | glass beads | molten silica | carbon fiber powder | glass fiber powder | glass fiber powder |
| Average particle size or average fiber length (μm) | 40 | 70 | 50 | 70 | 40 | 40 |
| Organosilane for surface-treatment | | | | | | |
| Kind | γ-amino-propyltri-ethoxysilane | γ-methacryl-oxypropyltri-methoxysilane | non | phenyltri-methoxysilane | phenyltri-methoxysilane | phenyltri-methoxysilane |
| Volume of water (ml) | 1500 | 1500 | 1500 | 1500 | 1500 | 1500 |
| Organic liquid | | | | | | |
| Kind | 1,1,1-tri-chloroethane | trichoro-trifluoro-ethane | tetrachloro-fluoroethane | carbon tetrachloride | 1,1,1-tri-chloroethane | 1,1,1-tri-chloroethane |
| (Surface tension: dyne/cm) | (26) | (18) | (23) | (45) | (26) | (26) |
| Volume (ml) | 300 | 300 | 300 | 300 | 300 | 300 |
| Degree of filler separation | 0.5 | 2.5 | 45.0 | — | 0.5 | 1.0 |
| Properties of granular powder | | | | | | |
| Average particle (μm) | 550 | 570 | 600 | Granulation could not be carried out, because the powders could not be agglomerated in the slurry. | 450 | 420 |
| Bulk density (g/cc) | 0.72 | 0.73 | 0.77 | | 0.70 | 0.75 |
| Powder flowability (times) | 8< | 4 | 5 | | 2 | 8< |
| Generation ratio of fine powder (%) | 1.5 | 2.5 | 8.0 | | 0.1 | 1.5 |
| Properties molded article | | | | | | |
| Size (mm) (diameter × height) | 256 × 200 | 256 × 200 | 256 × 200 | — | 100 × 100 | 100 × 100 |
| Coloration or color change | D | C | A | | B | A |
| Gas permeability | ○ | ○ | ○ | — | ○ | X |
| Tensile strength (kg/cm²) | 140 | 150 | 160 | | 240 | 185 |
| Elongation (%) | 270 | 250 | 283 | — | 300 | 260 |

According to the process for preparing a filler-containing PTFE granular powder of the present invention, the separation of (semi-)hydrophilic filler in granulation step can effectively be avoided, and the resulting granular powder and also the molded article prepared therefrom can contain the filler effectively and uniformly. The PTFE molded article prepared by the granular powder has not only excellent mechanical properties but also good appearance and less coloration even if a molded article is thick and large in diameter. Accordingly, the molded article is useful as sealing parts for cars and parts for electronic oven.

What we claim is:

1. A process for preparing polytetrafluoroethylene granular molding powders containing fillers, which comprises admixing a polytetrafluoroethylene powder having an average particle size of not more than 100 μm and a hydrophilic or semi-hydrophilic filler which is surface-treated with a surface-treatment agent consisting essentially of an organosilane of the formula (I):

wherein X is a hydrolyzable residue having no amino group, Y is hydrogen atom, an alkyl group of 1 to 4 carbon atoms or an halogen atom, n is 1 or 2, in a two-phase liquid medium comprising water and a water-insoluble organic liquid having a surface tension of not more than 35 dynes/cm at 25° C.

2. The process of claim 1, wherein a silicone oil is added in an amount of 0.00005 to 0.005% by weight based on the mixture of polytetrafluoroethylene powder and filler.

3. The process of claim 1, wherein a polytetrafluoroethylene dispersion is present in water in an amount of 0.1 to 2.5% by weight based on the mixed powder of the polytetrafluoroethylene powder and the filler.

4. The process of claim 1, wherein the organosilane is an organoalkoxysilane of the formula (II);

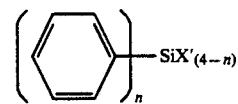

wherein X' is an alkoxy group of 1 to 4 carbon atoms and n is as defined above.

5. The process of claim 1, wherein the organic liquid is a halogenated hydrocarbon having 2 to 3 carbon atoms, at least on fluorine atom and at least one hydrogen atom.

6. Polytetrafluoroethylene granular powders obtained by the process of claim 1.

* * * * *